UNITED STATES PATENT OFFICE.

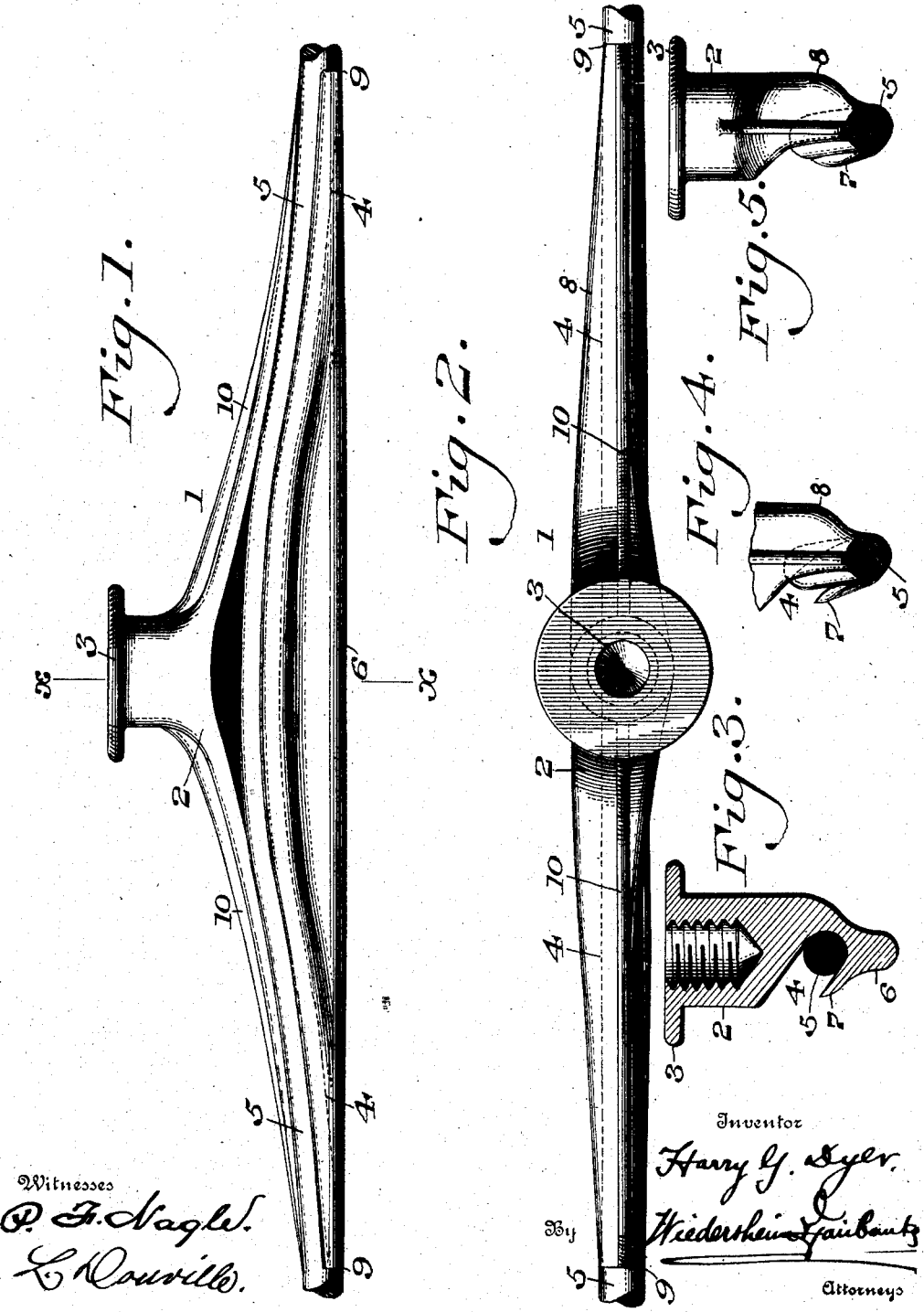

HARRY G. DYER, OF GLOUCESTER CITY, NEW JERSEY, ASSIGNOR OF ONE-HALF TO WILLIAM J. VAN METER, OF GLOUCESTER, NEW JERSEY.

TROLLEY-WIRE HANGER OR EAR.

No. 864,520.  Specification of Letters Patent.  Patented Aug. 27, 1907.

Application filed September 7, 1906. Serial No. 333,683.

*To all whom it may concern:*

Be it known that I, HARRY G. DYER, a citizen of the United States, residing at Gloucester City, in the county of Camden, State of New Jersey, have invented a new and useful Trolley-Wire Hanger or Ear, of which the following is a specification.

In the construction of trolley wire hangers or ears heretofore in use, it has been found that the connecting of the conductors therewith has been attended with considerable difficulty. It is furthermore essential that in use the trolley wire should present as nearly as possible, a uniform surface or rectilinear line for the travel of the trolley wheel so that the wheel will not be liable to move from the trolley wire and to the above ends my invention consists of a novel construction of trolley wire co-acting therewith so that the line of junction between the hanger and trolley wire is substantially in the same plane or rectilinear line of the trolley whereby a sharp blow which is often communicated to the roof of the car when the trolley travels over the hanger or ear and which is unpleasant to the passengers and injurious to the car construction is prevented.

For the purpose of illustrating my invention, I have shown one form of apparatus which has been found to give satisfactory results, and it is to be understood that various modifications thereof may be had by those skilled in the art, which shall fall within the scope and spirit of my invention.

Figure 1 represents a side elevation of a trolley wire hanger or ear embodying my invention. Fig. 2 represents a plan view of Fig. 1. Fig. 3 represents a section on line $x$—$x$, Fig. 1. Fig. 4 represents an end view of Fig. 1, showing the initial position of the parts. Fig. 5 represents an end elevation similar to Fig. 4, but showing the position the parts assume when the trolley wire is secured in position in its seat.

Similar numerals of reference indicate corresponding parts in the figures.

Referring to the drawings:—1 designates the hanger or ear, the same being composed of the body portion 2 and having the threaded flange or socket 3 adapted for the reception of the insulator.

4 designates the ears or seat in the side wall of the trolley ear which is adapted for the reception of the trolley wire 5, said seat being provided with a gradual curve or arc shaped contour to which the trolley wire 5 substantially conforms when the parts are assembled as seen in Fig. 1.

7 designates a lip which is preferably integral with the side wall of the trolley wire hanger or ear and which extends upwardly from the bottom 6 of the ear as will be understood from Figs. 3 to 5, said lip after the parts are assembled being beaded over or turned inwardly upon the trolley wire as indicated in Fig. 5, whereby the wire is expeditiously and efficiently locked in position by a suitable implement in a cheap and effective manner.

It will be understood that the parts initially appear as seen in Figs. 3 and 4, the wire 5 being inserted in the longitudinally extending upwardly curved seat or ears 4 and that after said wire has been placed in position, it is securely retained by turning the lip 7 inwardly as is indicated in Fig. 5.

The trolley wire may be of any suitable diameter and the walls of the seat or ears 4 shaped so that when said parts are assembled as seen in Fig. 5, the wire is securely inclosed and locked in position and when in place, will not be liable to laterally disengage therefrom.

I desire to call special attention to the fact that the wall 6 extends in substantially a rectilinear line with the under surface of the trolley wire 5, there being at the points 9, no shoulders or projections but on the contrary, the trolley can travel from the wire 5 along the path 6 in a substantially rectilinear path whereby the blow which is communicated to the roof of the car, which is unpleasant to passengers and which is injurious to the car and to the overhead construction is wholly obviated.

In order to provide sufficient metal for the seat 4, I thicken one side of the wall of the ear as indicated at 8 so that the tensile strength of the hanger or ear will not be reduced by the provision of the seat 4 and I also provide the rib or web 10 whereby a very rigid and efficient structure is produced.

It will be apparent that my device can be readily applied to the trolley wire and requires no extraneous fastenings to secure it in place.

It will furthermore be apparent that by my formation of the lower wall 6 so that the same forms a continuation in a rectilinear line at the bottom of the trolley wire 5, that no shoulders are formed at the points 9, so that the trolley wheel is not deflected from a right line during its travel.

I am aware that it has heretofore been proposed to construct a trolley ear of an integral piece of material and that it has also been proposed to partially inclose the trolley wire in a seat having a curvilineal contour, but my present invention is particularly directed to the feature of a trolley ear having a trolley wire secured throughout its entire length within a seat, which curves upwardly and downwardly and is formed by properly thickening the side walls of the device whereby the trolley wire is secured in position throughout its entire and uninterrupted length by a wall or lip of such character that it is positively and effectively retained in position under all conditions.

The lower portion of the ear between the points 9, 9 is reduced in thickness as shown in Figs. 1 and 3 so as to be of substantially the thickness of the diameter of the seat for the trolley wire, so that not only does the bottom wall of the ear form an unbroken continuity with the under surface of the trolley wire throughout the entire length of the hanger, but this portion is of substantially the diameter of the trolley wire and crystallization of the wire between the ends and center of the hanger is prevented and the "knock" on the wire is avoided. The upward curve of the seat toward the center from both ends brings the bendable lip so far away from the portion upon which the trolley travels that the increase of metal necessary to clamp the wire is brought above the plane of contact of the trolley.

Having thus described my invention, what I claim as new and desire to secure by Letters Patent, is:—

1. In a trolley wire hanger or ear, a body portion having a seat and one side thereof provided with a bendable lip continuous throughout the entire length of the hanger and curved upwardly and downwardly, the portion below said seat being of substantially the same thickness as the diameter of said seat, said seat being adapted to receive a trolley wire, the bottom wall of said ear forming an unbroken continuity with and covering the under surface of said trolley wire throughout the length of the hanger and said wire being retained in position by said lip inturned.

2. As an improved article of manufacture, a trolley wire hanger or ear comprising a body portion with a seat, a portion below said seat reduced in thickness to substantially the diameter of the seat, and a bendable lip above said reduced portion to hold a wire in said seat, whereby the portion contacted by the trolley is of substantially the same cross area as that of the wire.

3. As an improved article of manufacture, a trolley wire hanger or ear comprising a body portion with a seat, a portion below said seat reduced in thickness to substantially the diameter of the seat, and a bendable lip above said reduced portion to hold a wire in said seat, whereby the portion contacted by the trolley is of substantially the same cross area as that of the wire, said seat and lip being both curved upwardly from the ends toward the center.

4. As an improved article of manufacture, a trolley wire hanger or ear comprising a body portion with a seat, a portion below said seat reduced in thickness to substantially the diameter of the seat, and a bendable lip above said reduced portion to hold a wire in said seat, whereby the portion contacted by the trolley is of substantially the same cross area as that of the wire, said seat and lip being both curved upwardly from the ends toward the center, the bottom wall of said ear forming an unbroken continuity with and of the same diameter as the wire throughout the length of the hanger.

HARRY G. DYER.

Witnesses:
E. HAYWARD FAIRBANKS,.
JOHN A. WIEDERSHEIM.